United States Patent [19]

Urffer

[11] Patent Number: 4,607,697
[45] Date of Patent: Aug. 26, 1986

[54] PROPPING AGENT BASED ON ZIRCONIA AND SILICA FOR DEEP GEOLOGICAL FRACTURES

[75] Inventor: Daniel Urffer, Morieres-les-Avignon, France

[73] Assignee: Societe Europeenne des Produits Refractaires, Neuilly-Sur-Seine, France

[21] Appl. No.: 762,779

[22] Filed: Aug. 6, 1985

Related U.S. Application Data

[62] Division of Ser. No. 312,749, Oct. 19, 1981.

[30] Foreign Application Priority Data

Nov. 13, 1980 [FR] France ............................ 80 24128

[51] Int. Cl.$^4$ ............................................ E21B 43/267
[52] U.S. Cl. .................................. 166/280; 166/308
[58] Field of Search ................ 166/271, 280, 308; 501/107

[56] References Cited

U.S. PATENT DOCUMENTS

| | | | |
|---|---|---|---|
| 4,072,193 | 2/1978 | Sarda et al. | 166/280 |
| 4,106,947 | 8/1978 | Recasens et al. | 501/107 |
| 4,427,068 | 1/1984 | Fitzgibbon | 166/280 |
| 4,522,731 | 6/1985 | Lunghofer | 166/280 X |

Primary Examiner—Stephen J. Novosad
Assistant Examiner—Thomas J. Odar
Attorney, Agent, or Firm—Watson, Cole, Grindle & Watson

[57] ABSTRACT

The invention relates to a granular propping for use in petroleum extraction which has a high mechanical resistance and a density of between 3150 and 3250 kg/m$^3$, the propping agent consisting of balls formed by melting, granulating and solidifying an initial composition comprising by weight, on the basis of the oxides, 47.1 to 48.7 parts of $ZrO_2$, 52.9 to 51.3 parts of $SiO_2$, the total of $ZrO_2 + SiO_2$ amounting to 100 parts, 8.2 to 16.9 parts of $Al_2O_3$ and 4.1 to 8.5 parts of at least one oxide selected from the group formed by MgO, CaO, FeO and $TiO_2$.

3 Claims, No Drawings

PROPPING AGENT BASED ON ZIRCONIA AND SILICA FOR DEEP GEOLOGICAL FRACTURES

This application is a divisional application of application Ser. No. 312,749, filed Oct. 19, 1981.

BACKGROUND OF THE INVENTION

1. Field of the Invention

The present invention relates to the field of petroleum extraction and is concerned with an agent for propping fractures formed in the walls of an oil well which passes through geological formations.

2. The Prior Art

The method of bringing about stimulation of wells by fracturing of geological strata, for example, by injecting a fluid at high pressure at the level of the formation which it is desired to fracture, then by injecting solid granular materials (propping agent) in order to prevent the fractures from closing up.

Various materials have been proposed. However, in geological formations at great depths, whose use for extraction of oil or natural gas is being developed, the stresses exerted on the piles of solid grains are such that many materials which are usually used, especially siliceous sand or glass balls, become fragmented to a considerable extent. It is found that the fragments formed reduce the permeability of the fracture. Because of this, the production from fractured formations is decreasing.

It has moreover been observed that the behaviour of propping agents with respect to the stresses encountered in this type of operation is not only in relation to the resistance of individual grains to crushing. Hence supporting agents with a lesser breakage rate in a multilayer bed have been sought.

At the present time there are propping agents on the market which consist of sintered alumina or bauxite. Société Européenne des Produits Réfractaires of Nevilly-Sur-Seine, France, is also marketing a propping agent which consists of zirconia and silica in proportions which are such that the ratio by weight $ZrO_2/SiO_2$ is at least 1.5, alumina and sodium oxide can be likewise included in a optional manner (see French Pat. Nos. 2,306,327 and 2,359,274 and U.S. Pat. No. 4,072,193). All the propping agents with high mechanical resistance available on the market have high densities i.e., at least 3300 kg/m³ and up to 3800 kg/m³.

The injection of propping agents whose density is high creates transport difficulties at the bottom of the fractures owing to their rate of sedimentation in the fracturing fluid. It is hence necessary to use more viscous and more dense fluids in order to limit sedimentation as much as possible and to enable a progressive placing right to the bottom of the fractures formed. These fluids do not always give the best results (deterioration of the fluid, damage to the formation) and are, moreover, very costly.

It would hence be of interest on the technical and economical level to have available propping agents with high mechanical resistance for large depths, but which have a density which is less than the values encountered for the propping agents available at present. Besides the economic value offered by the utilisation of a less complex fracturing fluid, the lowering of the density of the propping agents will result in a decrease in the rate of sedimentation and thus will contribute to a better efficiency of the operation by promoting the placing of propping agents into a larger proportion of the fracture. In a fluid, the rate of sedimentation of a particular solid is proportional to the difference of the densities of the solid and of the carrying liquid. All else being otherwise equal, the reduction of the density of a propping agent from 3800 to 3200 kg/m³ will result in a reduction of the rate of sedimentation by 21% in a fluid with a density of 1000 kg/m³ and of 24% in a fluid with a density of 1300 kg/m³.

The object of the present invention is to supply a propping agent with a high mechanical resistance, especially in the multilayer bed, with a density less than 3250 kg/m³.

SUMMARY OF THE INVENTION

More especially, the present invention is concerned with a granular propping agent of high mechanical resistance having a density of less than 3250 kg/m³ which consists of balls formed by melting, granulating and solidifying an initial composition which comprises essentially by weight, on the basis of the oxides, 46–50 parts of $ZrO_2$, 54 to 50 parts of $SiO_2$, the total of $ZrO_2 + SiO_2$ amounting to 100 parts, 0–19 parts of $Al_2O_3$ and 0 to 13.5 parts of at least one oxide selected from the group formed by MgO, CaO, FeO and $TiO_2$.

The initial composition includes preferably 47.1 to 48.7 parts of $ZrO_2$, 52.9 to 51.3 parts of $SiO_2$, the total of $ZrO_2 + SiO_2$ amounting to 100 parts, 8.2 to 16.9 parts of $Al_2O_3$ and 4.1 to 8.5 parts of at least one oxide selected from the group formed by MgO, CaO, FeO and $TiO_2$.

The composition of the balls is approximately identical to that of the initial composition.

The propping agents whose composition comes within the broad range defined above have a behavior in the laboratory tests described below which is equivalent to that of the known high resistance propping agents up to effective stresses of 70 MPa.

Propping agents whose composition falls within the preferred range defined above have densities between 3150 and 3250 kg/m³ inclusive and a behavior equivalent to that of the high resistance propping agents known at present, up to effective stresses of 100 MPa, which is greater than the effective stresses encountered in the deepest strata.

The manufacture of the balls of the invention is carried out in a conventional manner. The batch of constituent oxides or of precursors thereof (natural mineral materials such as, for example, silicates) can be melted in an electric furnace. A thread of melted material is granulated by blowing (with air or water vapour). In this way balls of a grain size of 0.1 to 4 mm are obtained: the most suitable grain sizes for use as a propping agent are between 0.25 and 2.0 mm.

The manufacture of balls formed from $ZrO_2$ and $SiO_2$ alone with a ratio of $ZrO_2/SiO_2 \leq 1$ nevertheless presents difficulties as indicated in the French Pat. No. 2,320,276 or the U.S. Pat. No. 4,106,947. Hence, in order to avoid the problems encountered in the manufacture of balls made from $ZrO_2$ and $SiO_2$ alone, it is recommended to start with a composition which includes at least four parts of $Al_2O_3$ and also, preferably, at least one part of at least one oxide chosen from the group formed by MgO, CaO, FeO and $TiO_2$. It is an advantage to start with a composition containing 8.2 to 16.9 parts of $Al_2O_3$ and 4.1 to 8.5 parts of MgO, CaO, FeO and/or $TiO_2$ for 100 parts of the total $ZrO_2 + SiO_2$. The incorporation of these additives, especially in the above preferred range, facilitates the melting of the original composition and makes possible a granulation in the form of particles, the majority of which are spherical with a good yield. Hence the original preferred composition makes it possible to produce in the most economical manner (good yield) propping agents with a breakage rate in a multi-layer bed which is equivalent to that of the propping agents of high mechanical resistance but of a higher density.

The following non-limiting examples are given with a view to illustrating the invention.

EXAMPLES 1–8 AND COMPARATIVE EXAMPLES A TO D

Approximately spherical balls which have the composition and density indicated in Table 1 below, which also indicates the value of certain ratios between the constituents, are prepared by melting, granulation and solidification.

Balls according to examples 1 to 8 and the comparative examples A to D having a grain size in the range of 0.425 to 1.0 mm were subjected to a test for measuring the conductivity and a test for measuring the breakage rate. Although the balls of examples 1 and 2 come within the scope of the invention, they have manufacturing difficulties (poor yield), which makes them of less interest on the economic level.

The test for measuring the conductivity is a conventional test which consists of measuring the permeability k of a layer of the propping agent, which has an initial thickness h (6 mm), subjected to a pressure p, in relation to the passage of air under pressure at 20° C. The conductivity is equal to the product kh and is measured in Darcy-meters. At p=70 MPa the conductivity of the agents 1 to 8 is 0.95 to 1.1 Darcy-meter (value approximately constant) and is similar to that of the commercial samples C and D. The agents A and D have, on the other hand, a conductivity which drops from p=30 MPa and, for p=70 MPa, have a conductivity of less than 0.2 Darcy-meter.

The preferred agents 4, 5, 6 and 8 and the commercial samples C and D were tested up to p=100 MPa, their respective conductivities at this compacting pressure are 0.78, 0.72, 0.82, 0.68 and 0.78.

The conductivity of the propping agents of the invention hence compares favorably with that of the better commercial products although their density is clearly less.

The test for measuring the breakage rate consists of subjecting a multilayer bed of the agent to be tested, placed in a steel cylinder of diameter 50.8 mm, closed by a punch, to a pressure of 70 or 100 MPa according to the following programme: increase of pressure for one minute then maintaining the pressure for two minutes. The agent is then sieved on a sieve of 0.425 mm mesh size. The percentage of material passing through the sieve is the breakage rate. In the test at 70 MPa the breakage rates are as follows:

| Agent | 1 | 2 | 3 | 4 | 5 | 6 | 7 | 8 | A | B | C | D |
|---|---|---|---|---|---|---|---|---|---|---|---|---|
| Breakage rate, % | 0.6 | 1.8 | 1.9 | 0.9 | 0.5 | 0.6 | 0.8 | 0.4 | 19.1 | 9.3 | 0.5 | 0.5 |

In the test at 100 MPa, the breakage rates are as follows:

| Agent | 4 | 5 | 6 | 8 | C | D |
|---|---|---|---|---|---|---|
| Breakage rate, % | 2.1 | 2.9 | 2.5 | 1.4 | 3.5 | 3.2 |

The resistance of the agents according to the invention, especially the preferred agents, to compacting under high pressure compares favourably with that of the best commercially available propping agents.

The tests at 100 MPa subject the agents to stresses which are greater than those in fact encountered in the deposit strata.

TABLE 1

| Examples | Composition, in parts by weight, on the basis of the oxides | | Ratios by weight | | Density (Kg/m³) |
|---|---|---|---|---|---|
| 1 | $ZrO_2$<br>$SiO_2$ | 49.8<br>50.2 | $\frac{ZrO_2}{SiO_2} = 0.992$ | | 3240 |
| 2 | $ZrO_2$<br>$SiO_2$<br>$Al_2O_3$<br>$TiO_2$<br>$FeO$ | 46.35<br>53.65<br>0.81<br>0.20<br>0.20 | $\frac{ZrO_2}{SiO_2} = 0.864$<br>$\frac{Al_2O_3}{SiO_2} = 0.015$ | $\frac{TiO_2 + FeO}{SiO_2} = 0.008$ | 3100 |
| 3 | $ZrO_2$<br>$SiO_2$<br>$Al_2O_3$ | 49.2<br>50.8<br>4.7 | $\frac{ZrO_2}{SiO_2} = 0.969$ | $\frac{Al_2O_3}{SiO_2} = 0.093$ | 3160 |
| 4 | $ZrO_2$<br>$SiO_2$<br>$Al_2O_3$<br>$MgO$ | 48.7<br>51.3<br>9.3<br>4.2 | $\frac{ZrO_2}{SiO_2} = 0.949$<br>$\frac{Al_2O_3}{SiO_2} = 0.181$ | $\frac{MgO}{SiO_2} = 0.082$ | 3230 |
| 5 | $ZrO_2$<br>$SiO_2$<br>$Al_2O_3$<br>$MgO$ | 47.1<br>52.9<br>16.2<br>5.6 | $\frac{ZrO_2}{SiO_2} = 0.892$<br>$\frac{Al_2O_3}{SiO_2} = 0.306$ | $\frac{MgO}{SiO_2} = 0.106$ | 3180 |

TABLE 1-continued

| Examples | Composition, in parts by weight, on the basis of the oxides | | Ratios by weight | | Density (Kg/m³) |
|---|---|---|---|---|---|
| 6 | $ZrO_2$ | 48.3 | $\frac{ZrO_2}{SiO_2} = 0.934$ | $\frac{TiO_2}{SiO_2} = 0.146$ | 3170 |
|  | $SiO_2$ | 51.7 |  |  |  |
|  | $Al_2O_3$ | 10.2 | $\frac{Al_2O_3}{SiO_2} = 0.198$ |  |  |
|  | $TiO_2$ | 7.5 |  |  |  |
| 7 | $ZrO_2$ | 48.7 | $\frac{ZrO_2}{SiO_2} = 0.949$ | $\frac{TiO_2 + FeO}{SiO_2} = 0.030$ | 3130 |
|  | $SiO_2$ | 51.3 |  |  |  |
|  | $Al_2O_3$ | 8.1 | $\frac{Al_2O_3}{SiO_2} = 0.158$ |  |  |
|  | $TiO_2$ | 1.2 |  |  |  |
|  | FeO | 0.3 |  |  |  |
| 8 | $ZrO_2$ | 48.7 | $\frac{ZrO_2}{SiO_2} = 0.950$ | $\frac{CaO + TiO_2}{SiO_2} = 0.101$ | 3210 |
|  | $SiO_2$ | 51.3 |  |  |  |
|  | $Al_2O_3$ | 12.2 | $\frac{Al_2O_3}{SiO_2} = 0.238$ |  |  |
|  | CaO | 4.1 |  |  |  |
|  | $TiO_2$ | 1.0 |  |  |  |
| A* | $ZrO_2$ | 41.1 | $\frac{ZrO_2}{SiO_2} = 0.698$ | $\frac{TiO_2 + FeO}{SiO_2} = 0.003$ | 2950 |
|  | $SiO_2$ | 58.9 |  |  |  |
|  | $Al_2O_3$ | 0.6 | $\frac{Al_2O_3}{SiO_2} = 0.010$ |  |  |
|  | $TiO_2$ | 0.1 |  |  |  |
|  | FeO | 0.1 |  |  |  |
| B* | $ZrO_2$ | 37.2 | $\frac{ZrO_2}{SiO_2} = 0.592$ | $\frac{Al_2O_3}{SiO_2} = 0.008$ | 2840 |
|  | $SiO_2$ | 62.8 |  |  |  |
|  | $Al_2O_3$ | 0.5 |  |  |  |
| C[1] | sintered bauxite balls ($Al_2O_3 \approx 89\%$) | | | | 3730 |
| D[2] | Balls based on zirconia silica | | $\frac{ZrO_2}{SiO_2} = 2.2$ | | 3820 |

[1] Commercial Product sold under the name "High-Strength Proppant" by the CARBORUNDUM COMPANY
[2] Commercial Product sold under the name "E.R. 120 B" by the SOCIETE EUROPEENNE DES PRODUITS REFRACTAIRES
*The products A et B are experimental products outside the scope of the invention.

I claim:

1. In a method of stimulating oil wells by fracturing of geological strata by injecting a fluid at high pressure at the level of the strata to be fractured, then by injecting a solid granular propping agent in order to prevent the fractures from closing up, the improvement consisting in using a granular propping agent which is resistant to stresses of up to 100 MPa, has a density of between 3150 and 3250 kg/m³ and has a breakage rate, in a multilayer bed test, of no more than 2.9% at 100 MPa, said granular propping agent consisting of balls formed by melting, granulating and solidifying an initial composition which consists essentially, by weight on the oxide basis, of 47.1 to 48.7 parts of $ZrO_2$, 52.9 to 51.3 parts of $SiO_2$, the total of $ZrO_2$ and $SiO_2$ amounting to 100 parts, 8.2 to 16.9 parts of $Al_2O_3$ and 4.1 to 8.5 parts of at least one oxide selected from the group consisting of MgO, CaO, FeO and $TiO_2$.

2. A method as claimed in claim 1, wherein said balls have a grain size of 0.25 to 2.0 mm inclusively.

3. In a method of stimulating oil wells by fracturing of geological strata by injecting a fluid at high pressure at the level of the strata to be fractured, then by injecting a solid granular propping agent in order to prevent the fractures from closing up, the improvement consisting in using a granular propping agent which is resistant to stresses of up to 100 MPa, has a density of between 3150 and 3250 kg/m³ and has a breakage rate, in a multilayer bed test, of no more than 2.9% at 100 MPa, said granular propping agent consisting of balls containing, by weight on an oxide basis, 47.1 to 48.7 parts of $ZrO_2$, 52.9 to 51.3 parts of $SiO_2$, the total of $ZrO_2$ and $SiO_2$ amounting to 100 parts, 8.2 to 16.9 parts of $Al_2O_3$ and 4.1 to 8.5 parts of at least one oxide selected from the group consisting of MgO, CaO, FeO and $TiO_2$.

* * * * *